No. 716,236. Patented Dec. 16, 1902.
F. A. JOHNSON.
TYPE SETTING AND JUSTIFYING MACHINE.
(Application filed Feb. 1, 1899.)

(No Model.) 13 Sheets—Sheet 4.

Witnesses.
John F. Nelson
William E. Neff.

Inventor.
Frank Amos Johnson
By J. H. Watson
Attorney

No. 716,236. Patented Dec. 16, 1902.
F. A. JOHNSON.
TYPE SETTING AND JUSTIFYING MACHINE.
(Application filed Feb. 1, 1899.)
(No Model.) 13 Sheets—Sheet 5.

Witnesses
John F. Nelson
William E. Neff

Inventor
Frank Amos Johnson
By J. H. Watson
Attorney

Figure 4:
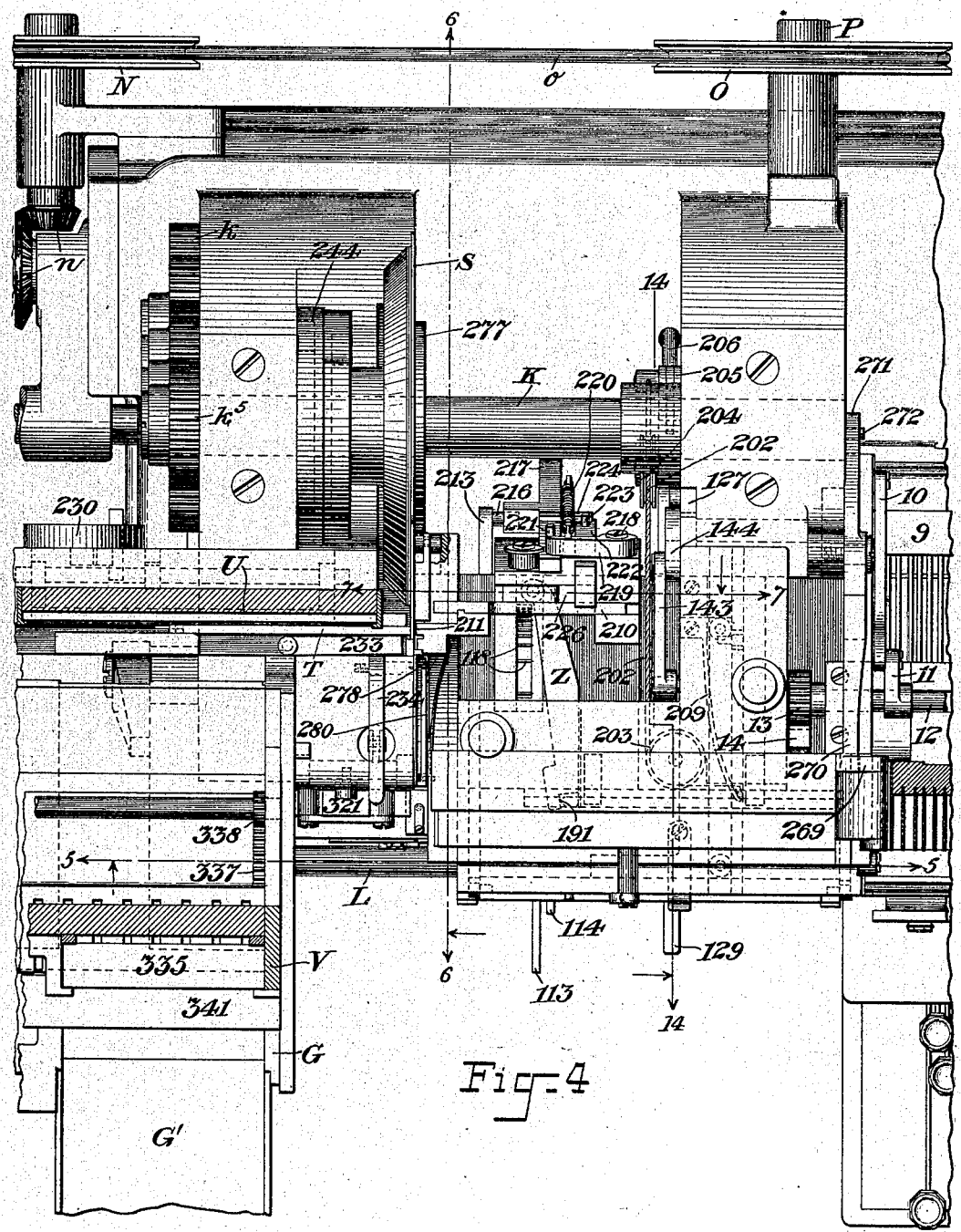

No. 716,236. Patented Dec. 16, 1902.
F. A. JOHNSON.
TYPE SETTING AND JUSTIFYING MACHINE.
(Application filed Feb. 1, 1899.)
(No Model.) 13 Sheets—Sheet 6.

on 6-6 fig. 4.

Witnesses
John F. Nelson.
William E. Neff

Inventor
Frank Amos Johnson.
By J. Watson
Attorney

No. 716,236. Patented Dec. 16, 1902.
F. A. JOHNSON.
TYPE SETTING AND JUSTIFYING MACHINE.
(Application filed Feb. 1, 1899.)
(No Model.) 13 Sheets—Sheet 7.
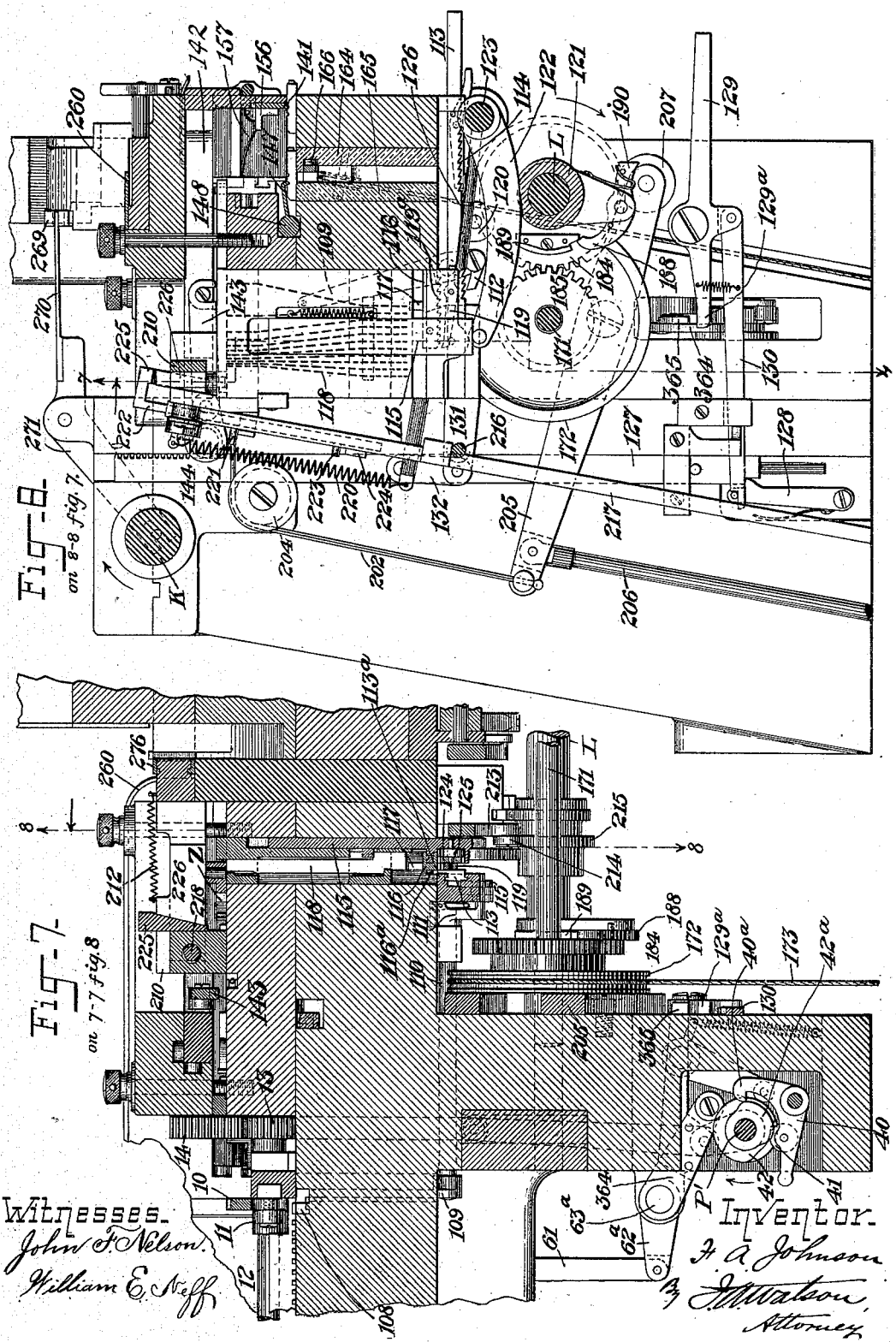

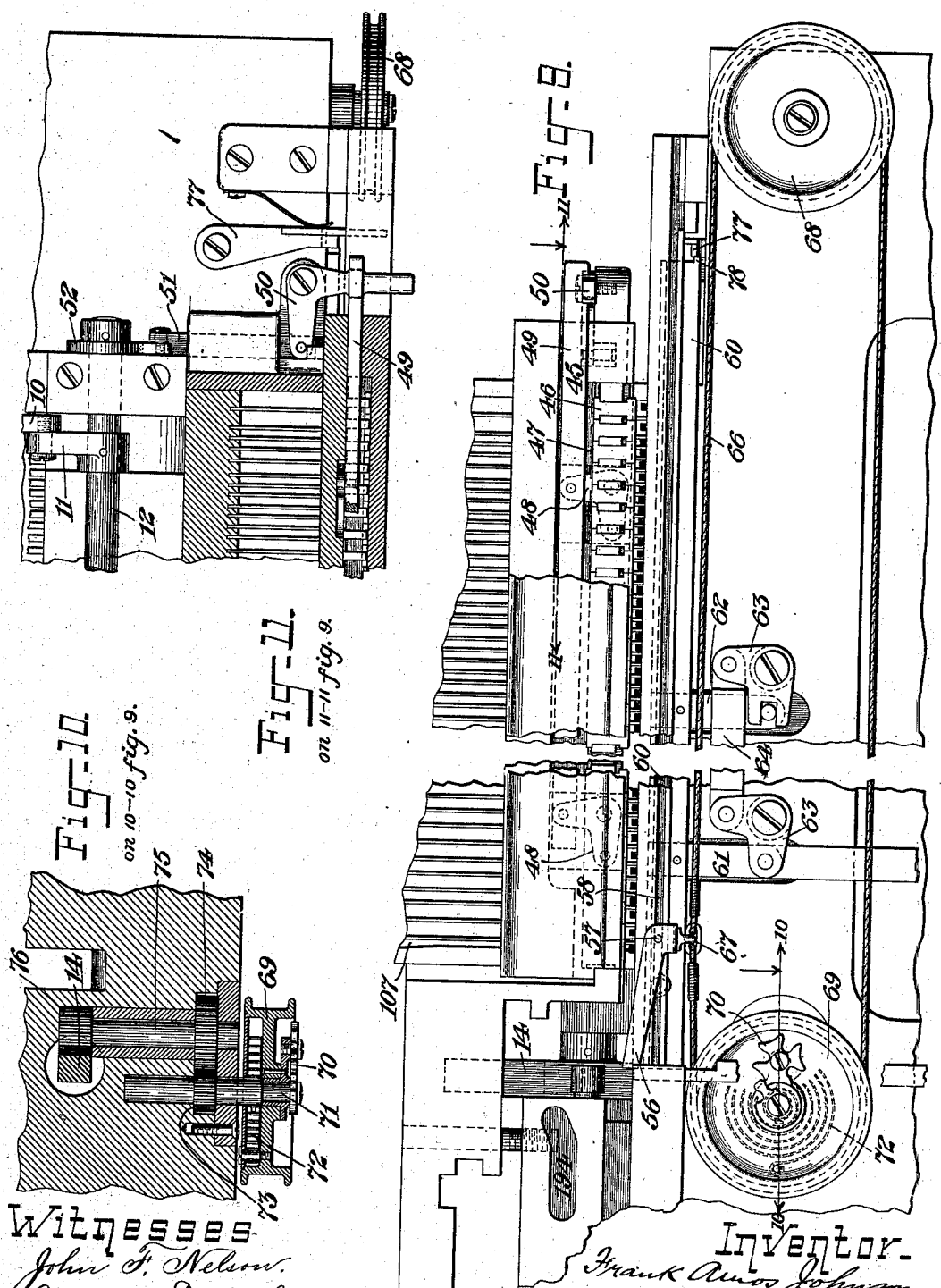

No. 716,236. Patented Dec. 16, 1902.
F. A. JOHNSON.
TYPE SETTING AND JUSTIFYING MACHINE.
(Application filed Feb. 1, 1899.)
(No Model.) 13 Sheets—Sheet 9.
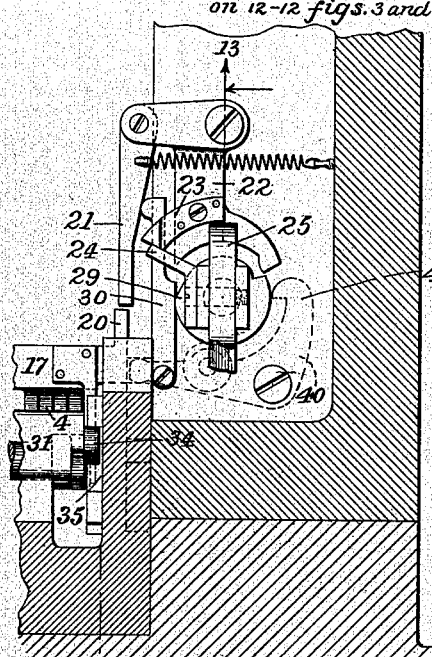
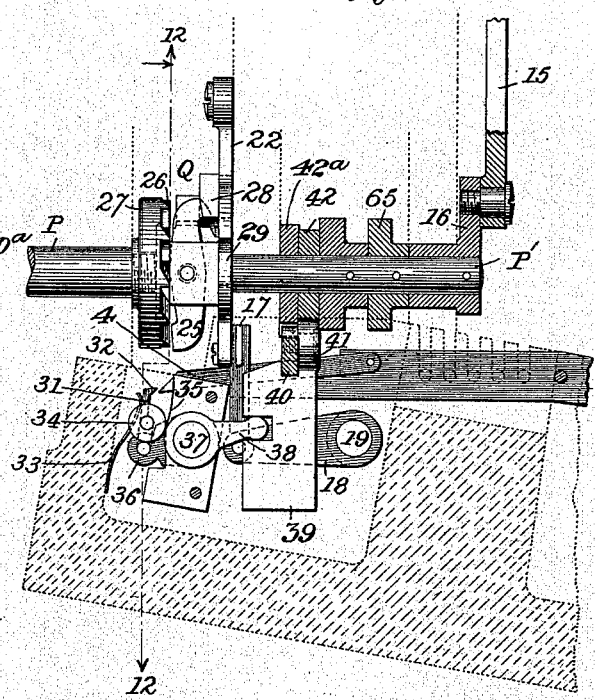
Witnesses.
John F. Nelson.
William E. Neff.
Inventor.
Frank Amos Johnson
By F. H. Watson
Attorney

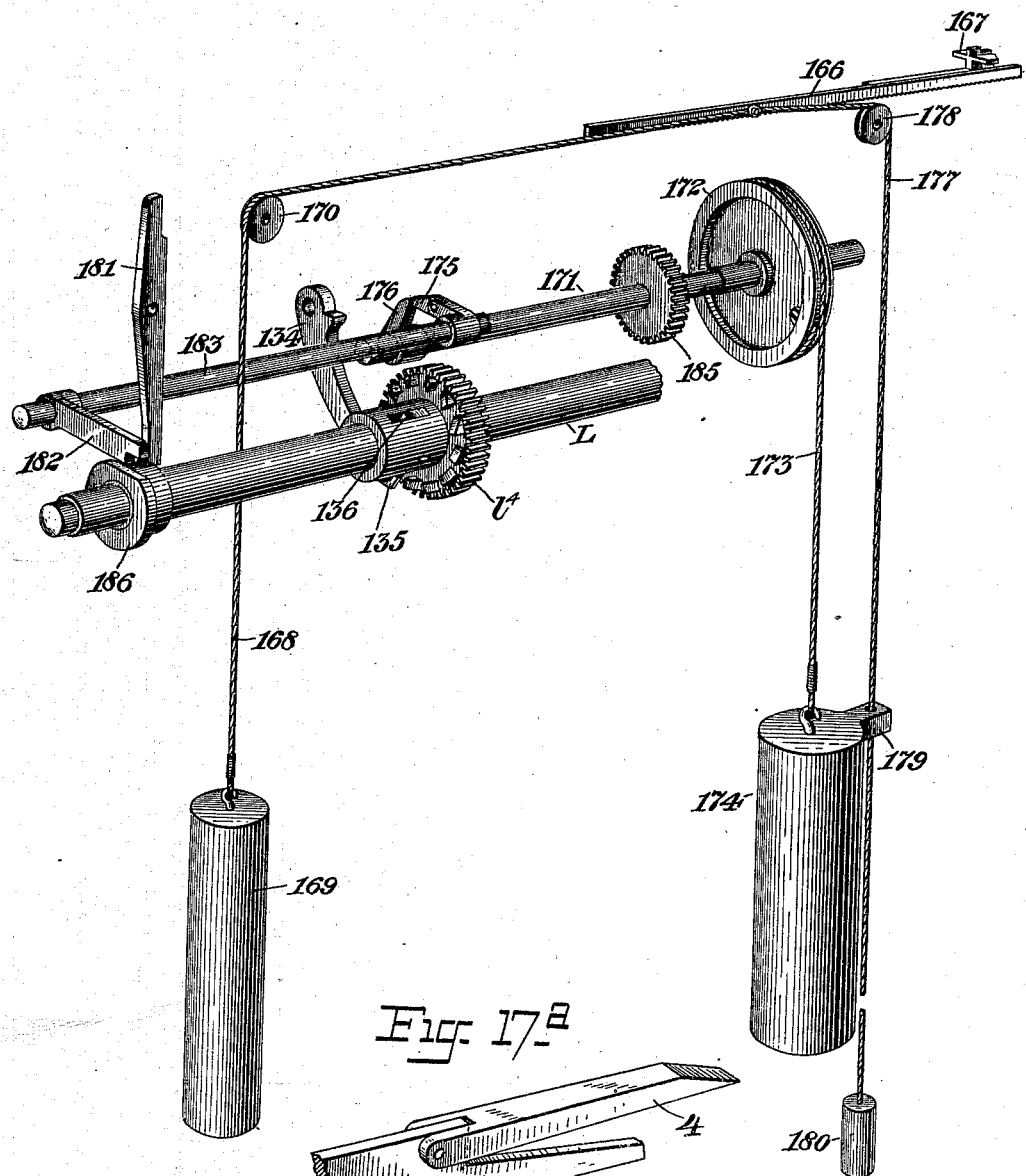

No. 716,236. Patented Dec. 16, 1902.
F. A. JOHNSON.
TYPE SETTING AND JUSTIFYING MACHINE.
(Application filed Feb. 1, 1899.)
(No Model.) 13 Sheets—Sheet 11.
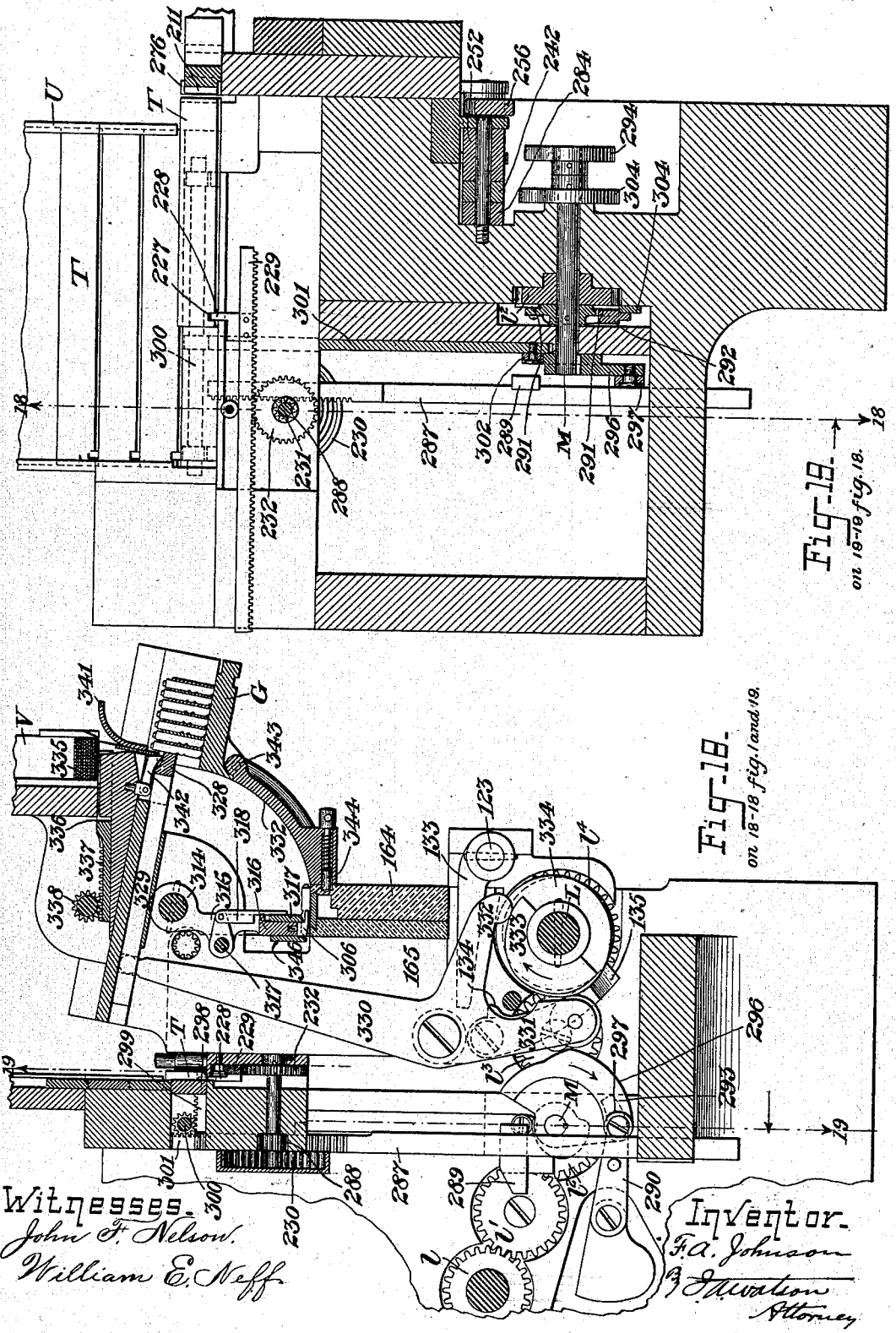

No. 716,236. Patented Dec. 16, 1902.
F. A. JOHNSON.
TYPE SETTING AND JUSTIFYING MACHINE.
(Application filed Feb. 1, 1899.)
(No Model.) 13 Sheets—Sheet 12.
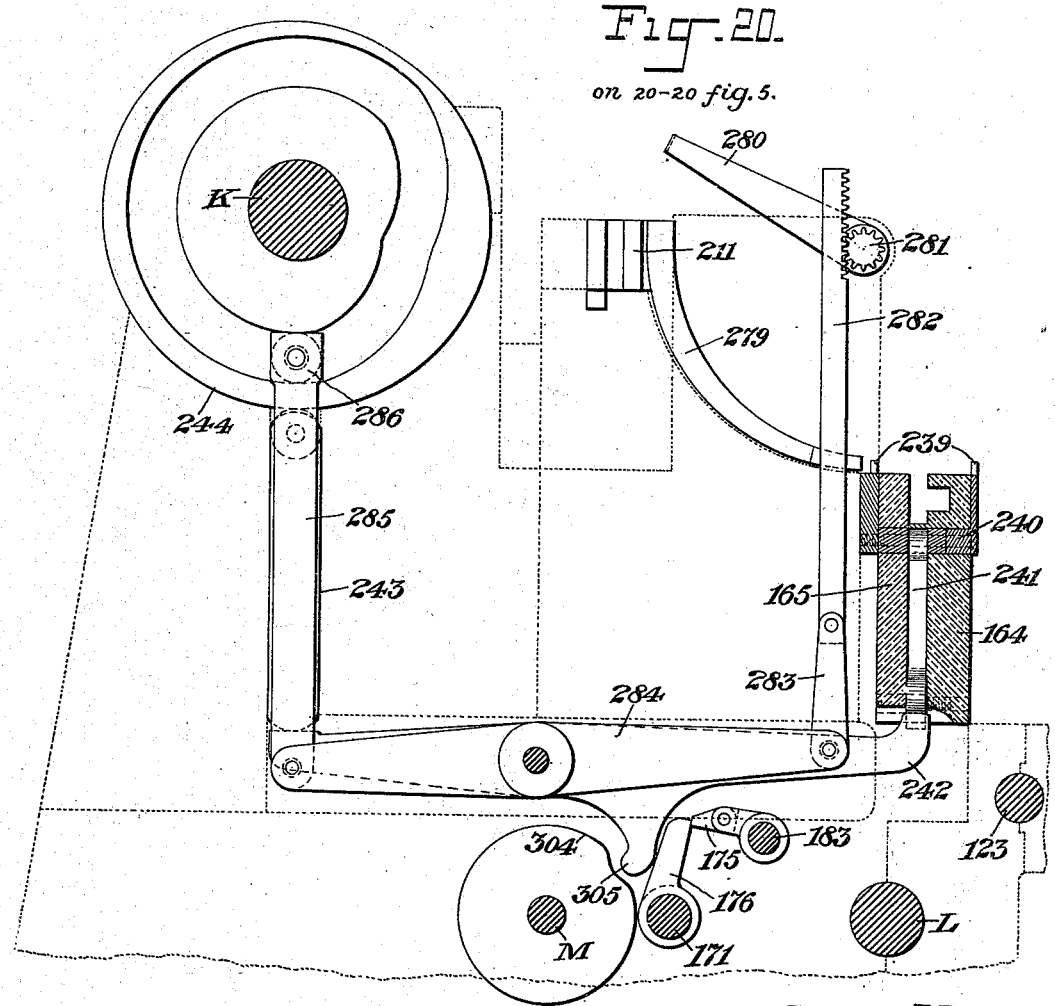
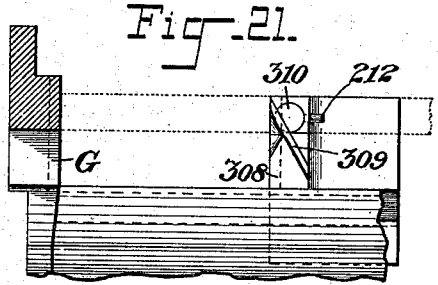
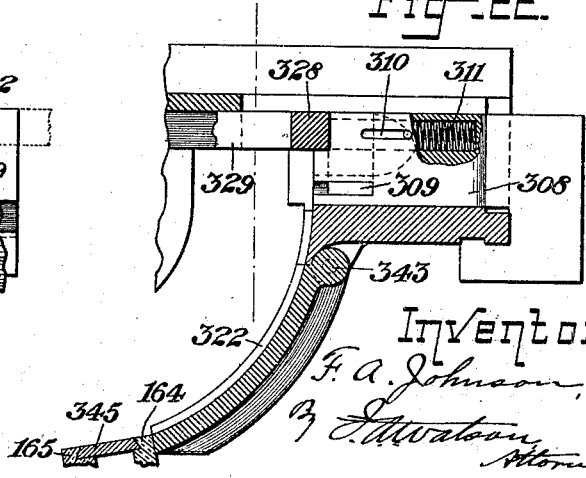
Witnesses
John F. Nelson.
William E. Neff.
Inventor
F. A. Johnson,
By F. H. Watson,
Attorney.

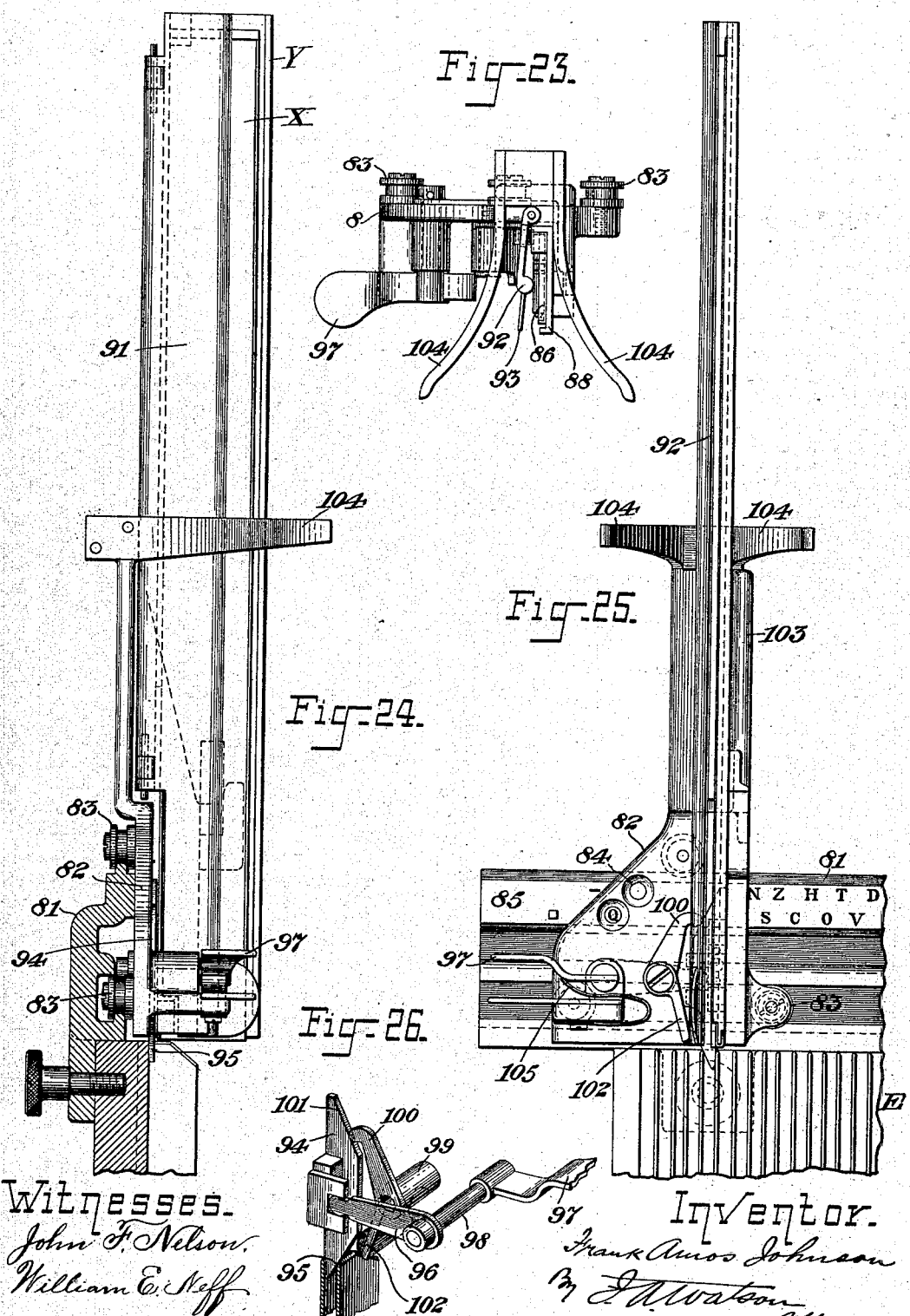

UNITED STATES PATENT OFFICE.

FRANK AMOS JOHNSON, OF NEW BEDFORD, MASSACHUSETTS, ASSIGNOR, BY MESNE ASSIGNMENTS, TO CONNECTICUT TRUST AND SAFE DEPOSIT COMPANY, TRUSTEE, OF HARTFORD, CONNECTICUT.

TYPE SETTING AND JUSTIFYING MACHINE.

SPECIFICATION forming part of Letters Patent No. 716,236, dated December 16, 1902.

Application filed February 1, 1899. Serial No. 704,174. (No model.)

*To all whom it may concern:*

Be it known that I, FRANK AMOS JOHNSON, a citizen of the United States, residing at New Bedford, in the county of Bristol and State of Massachusetts, have invented certain new and useful Improvements in Type Setting and Justifying Machines, of which the following is a specification.

The present invention comprises various improvements in the construction and arrangement of machines for setting and automatically justifying lines of type and assembling the lines in a galley, which improvements apply more particularly to machines heretofore patented by me and illustrated, for instance, in United States Letters Patent No. 607,047, dated July 12, 1898. In said patented machine and in the present case there are two mechanisms operating upon the type in succession. The assembling mechanism assembles the type in lines of irregular length in which the words are separated by temporary spaces of uniform thickness. As soon as a line is assembled it is transferred automatically to the second or justifying mechanism, which measures the line, prepares justifying-spaces to fill out the line to the proper length, inserts said spaces in lieu of the temporary spaces, and transfers the justified lines to a galley. The details of these mechanisms will be described fully in connection with the accompanying drawings, in which—

Figure 1:
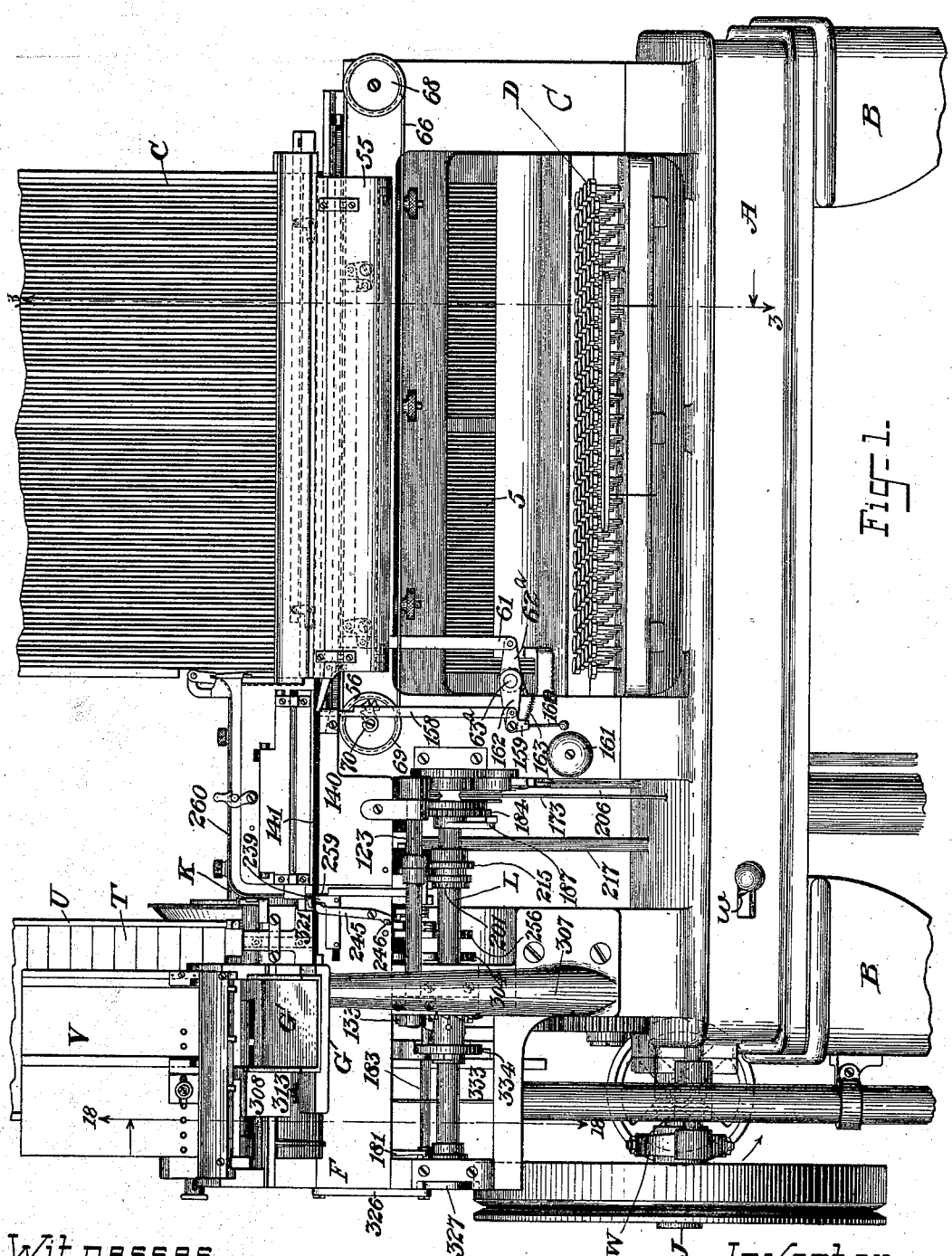
Figure 2:
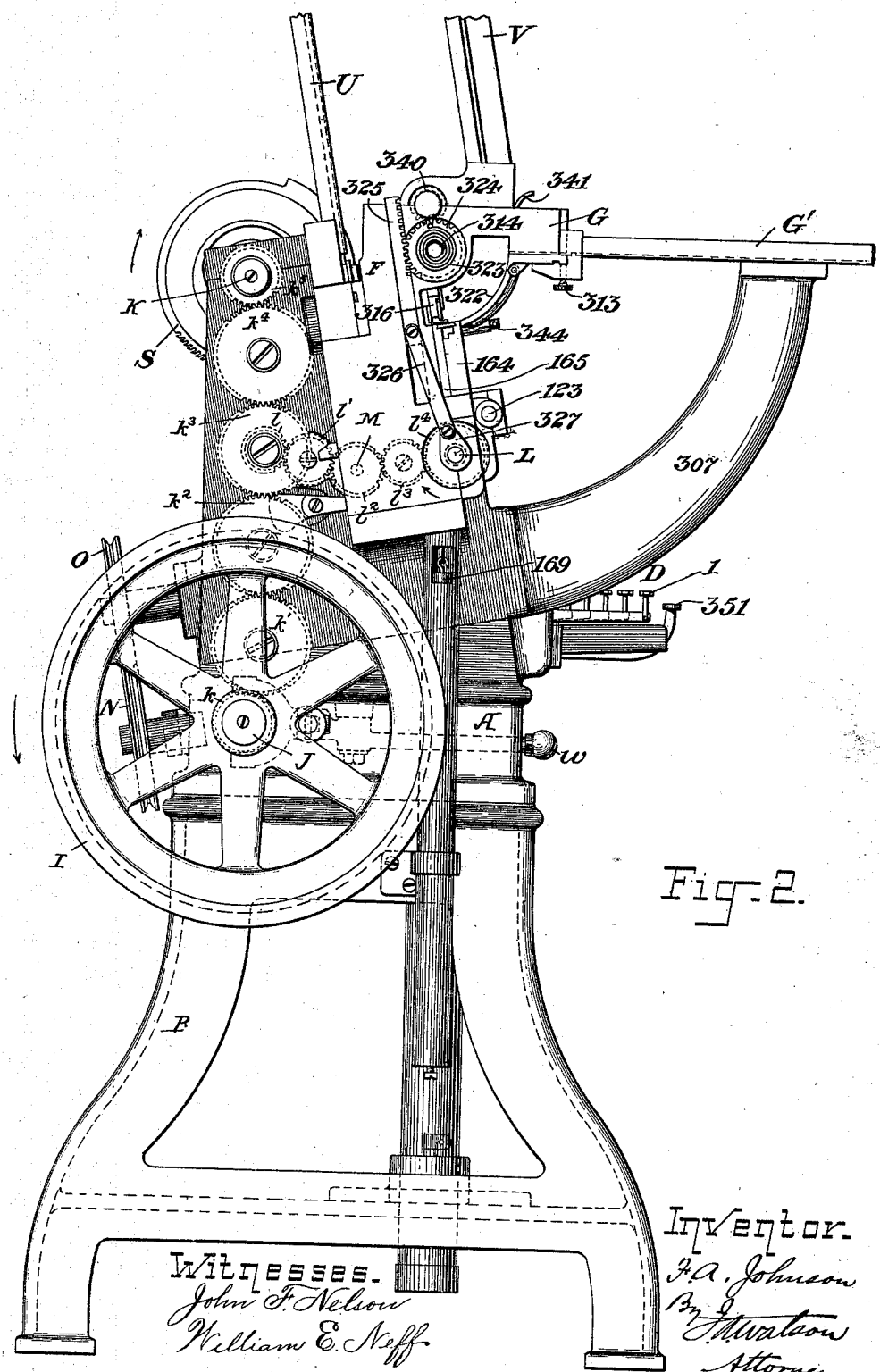
Figure 3:
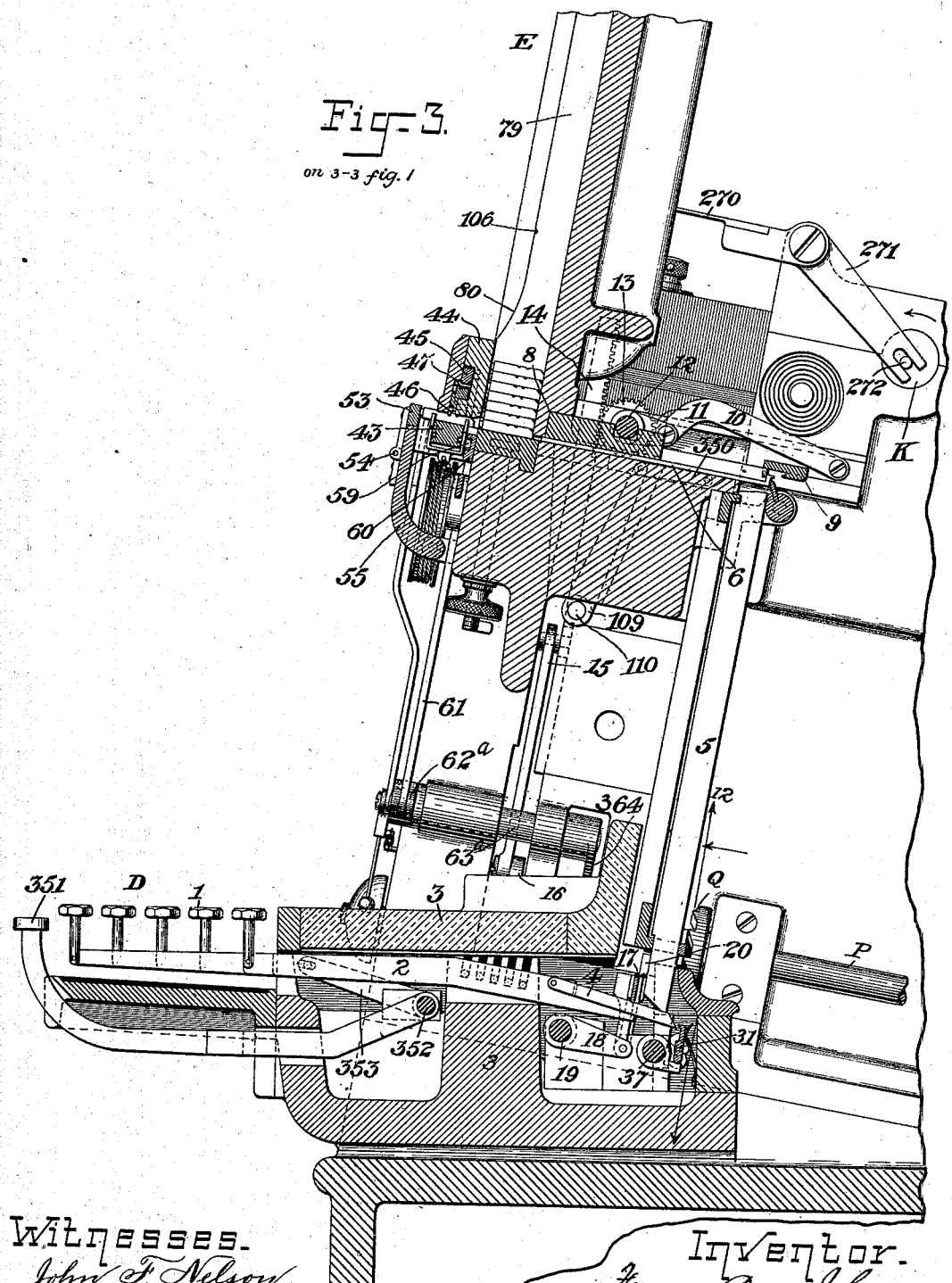
Figure 5:
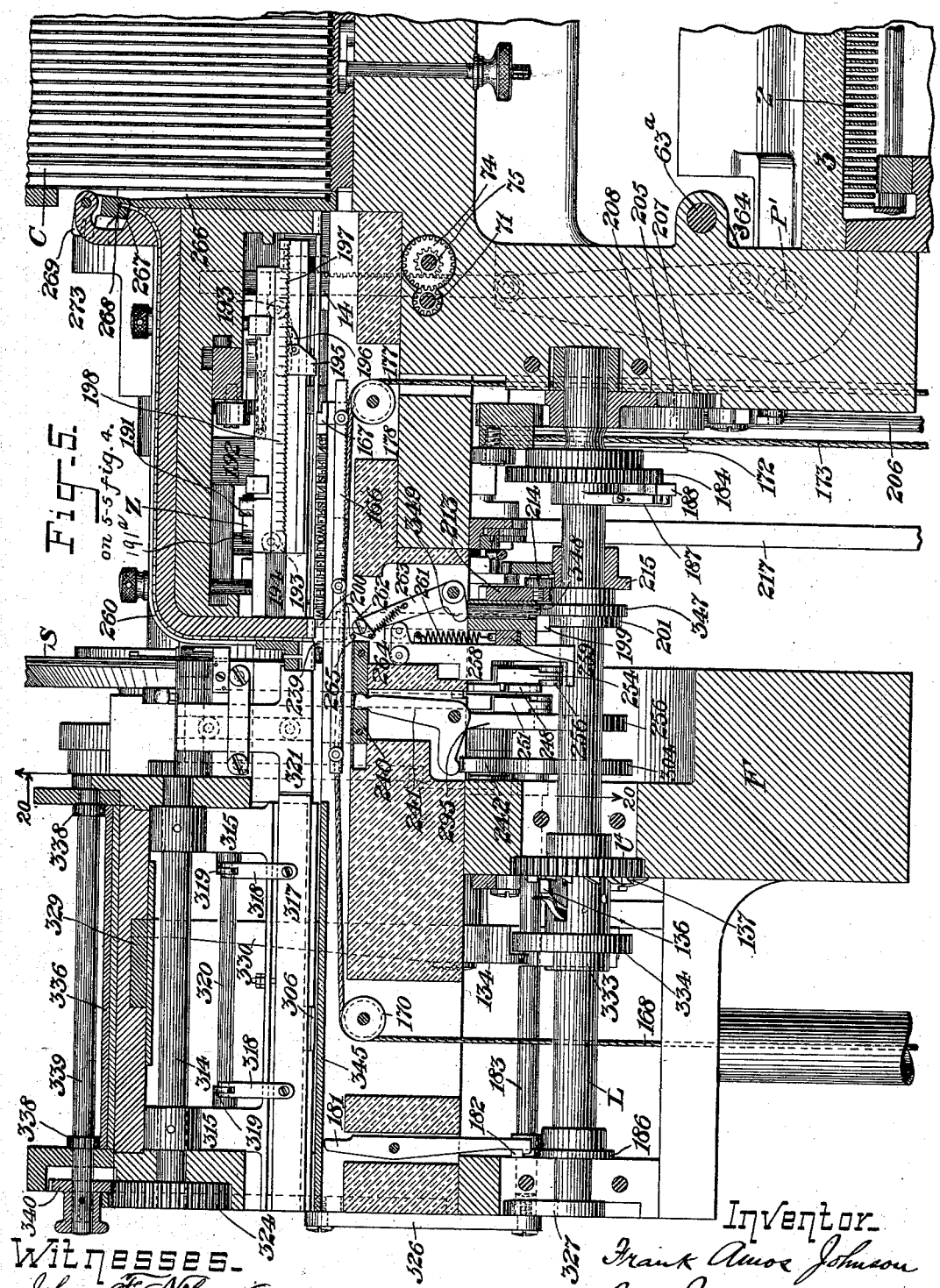
Figure 6:
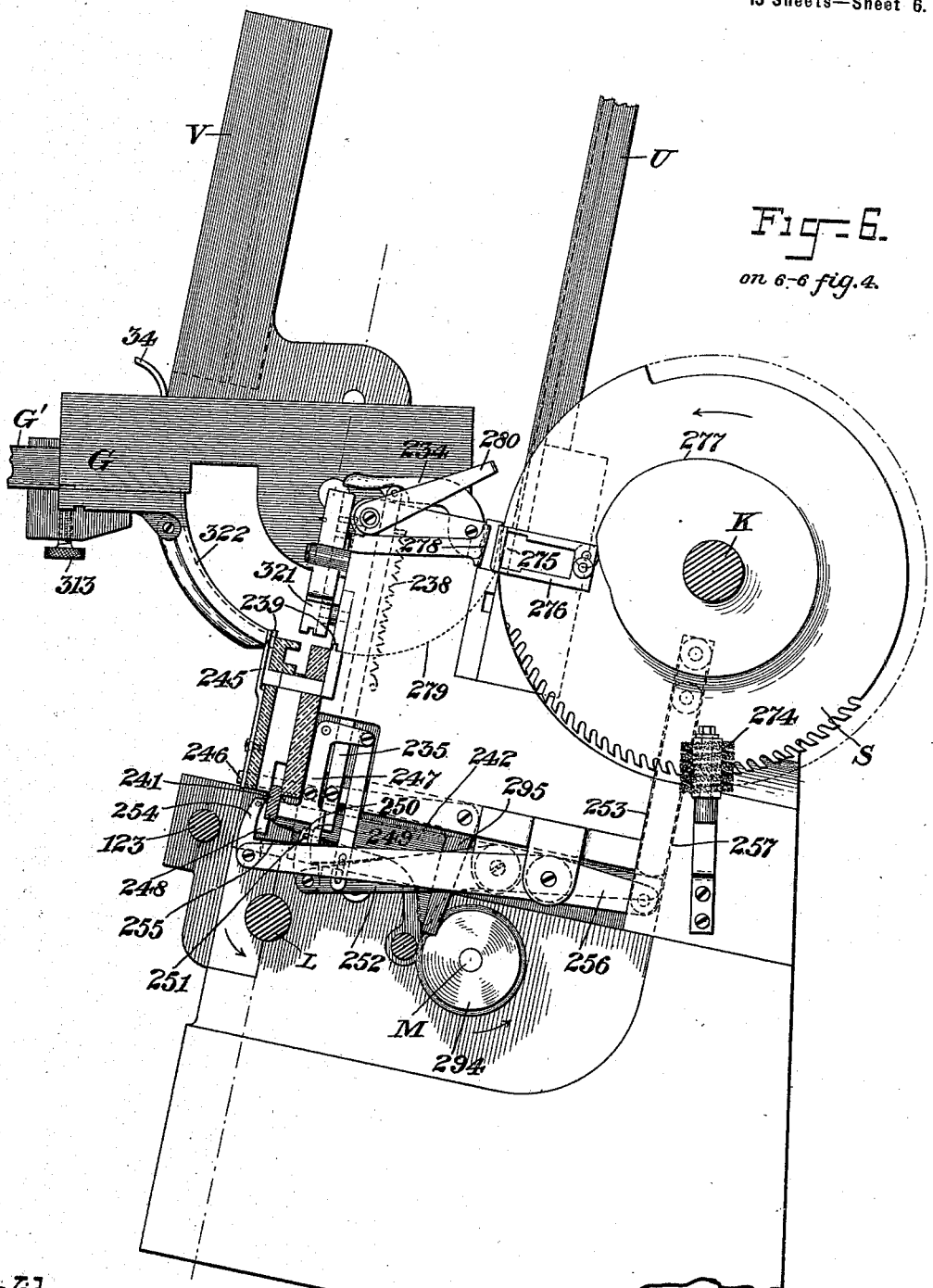

Figure 1 is a front view of the machine, the upper and lower parts being broken away. Fig. 2 is a left end view of the machine. Fig. 3 is a vertical section about on the line 3 3 of Fig. 1. Fig. 4 is a plan view of the middle and left end portions of the machine. Fig. 5 is a vertical section on the line 5 5 of Fig. 4. Fig. 6 is a vertical section about on the line 6 6 of Fig. 4. Fig. 7 is a section on the line 7 7 of Figs. 4 and 8. Fig. 8 is a section about on the line 8 8 of Fig. 7. Fig. 9 is a front view of a portion of the assembling mechanism on a large scale. Fig. 10 is a section on the line 10 10 of Fig. 9. Fig. 11 is a section on the line 11 11 of Fig. 9. Fig. 12 is a section about on the line 12 12 of Fig. 3. Fig. 13 is a section on the broken line 13 13 of Fig. 12. Fig. 14 is a section about on the line 14 14 of Fig. 4. Fig. 15 is a perspective view of a type-tray. Fig. 16 is a perspective view of part of the devices for loading the magazine. Fig. 17 is a perspective skeleton view of devices for conveying the line of type through the justifying mechanism. Fig. 17$^a$ is a detail of the connection between the key-levers and lifting-bars. Fig. 18 is a section about on the line 18 18 of Figs. 1 and 19. Fig. 19 is a section on the line 19 19 of Fig. 18. Fig. 20 is a section about on the line 20 20 of Fig. 5. Figs. 21 and 22 are details of the galley. Fig. 23 is a plan view, Fig. 24 a side view, and Fig. 25 a front view, of the magazine-loading devices; and Fig. 26 is a perspective view of a detached portion of said devices.

*General features.*—The type to be assembled are selected by means of a keyboard having keys corresponding to the characters with which the machine is supplied and a word-space key. There is also a line or starting key. With the exception of the manipulation of these keys the operation of the machine is entirely automatic. The mechanism is sustained upon a suitable frame comprising a base A, legs B, a heavy U-shaped bracket C, and other smaller brackets and bearings, in which the working parts are mounted. Power is supplied by a drive-wheel I on the main-shaft J at the left end of the machine. The drive-wheel may be thrown into and out of engagement with shaft J by a suitable clutch W, operated by lever $w$. By means of a train of gears $k$ to $k^5$, inclusive, power is transmitted to a shaft K, which may be termed the word "shaft," mounted in the upper part of the frame. From the gear $k^3$ power is transmitted through a train of gears $l$ $l'$ $l^2$ $l^3$ to a gear $l^4$, running loosely on a shaft L, which will be termed the "line-shaft." One of the intermediate gears $l^2$ runs loosely upon a shaft M for operating the space-timber-changing mechanism and is adapted to bring said shaft into operation periodically. Power is communicated from the drive-shaft J to a sheave N at the rear of the machine by means of a pair of bevel-gears $n$, and a sheave O on shaft P is driven by a belt $o$ from the sheave N. The type-assembling mechanism is driven from the shaft P, as will be hereinafter explained.

*Type-assembling mechanism.*—The assembling mechanism, as shown, occupies the right half of the machine. In front of the U-shaped bracket C is the keyboard D and supported upon said bracket is the magazine E. The keyboard and magazine are provided with all of the characters needed in ordinary composition. In this machine the assembling mechanism will select from the magazine and assemble into line simultaneously characters corresponding to any number of keys which may be simultaneously depressed. I am thus enabled to set the type for syllables or short words at a single stroke, provided the type occur in proper sequence in the magazine. To facilitate the formation of a large number of words and syllables in this manner, I have duplicated in the keyboard and magazine some of the characters which are most frequently used. In this manner I am enabled to set type very rapidly without running the machine at excessive speed.

The character-keys 1 are attached to the forward ends of key-levers 2, mounted upon suitable pivots in a key-box 3. Pivoted to each key-lever is a lifting-bar 4, which rests upon and extends beyond the rear end of the lever, Figs. 3 and 12. The key-levers extend into recesses in the bars 4, as indicated by dotted lines in Fig. 3. Over each lifting-bar 4 stands a vertical push-rod 5, which brings a corresponding type-ejector 6 into action when the push-rod is raised. There is a key, push-rod, and type-ejector for each magazine-channel. The construction and operation of the ejectors is exactly the same as described in Patent No. 607,047, above mentioned. They are guided in grooves in a cap-piece 8 and have upturned ends, which are engaged by a reciprocating ejector-bar 9 when the rear ends of the ejectors are raised by the push-rods. The ejector-bar is reciprocated by means of connecting-rods 10, cranks 11, shaft 12, pinion 13, vertically-sliding rack 14, connecting-rod 15, and crank 16 on an escape-shaft P', Figs. 3 and 13. The escape-shaft is in line with the running-shaft P, and it is brought into engagement therewith to cause it to make one revolution each time a key or group of keys is depressed by the following means: Over the pivoted bars 4 extends a common bail 17, Figs. 3, 12, and 13, which bail is carried by arms 18 upon a rock-shaft 19 to give it a parallel movement. When any key or group of keys is depressed, the bail 17 is raised and a projection 20 of the left end of the bail 17 raises a depending rod 21 and rocks an elbow 22. The stop 23 on said lever normally stands in the path of an arm 24 of the escapement-shaft P' to stop said shaft after it has made one turn. A pawl 25, pivoted on the end of said shaft, is urged by a spring (not shown) into engagement with teeth 26 on the face of a disk 27, carried upon the end of the shaft P; but said pawl is normally held out of engagement with said teeth by a cam projection 28 upon lever 22. When the lever 22 is rocked by raising the bar 21, the stop 23 is moved out of the path of the arm 24, and the pawl 25 is permitted to engage the toothed wheel 27, thereby rotating the escapement-shaft P'. During the revolution of the escapement-shaft cam 29, operating through lever 30, pushes the leg 21 off of the projection 20 and permits said leg to drop and restore the lever 22 to its normal position. At the end of a single revolution the pawl 25 is thrown out and the escapement-shaft brought to rest by the stop 23.

Standing normally in the rear of the lifting-bars 4 is a universal bar 31, having an upper edge 32 projecting forward. The bar 31 is normally pressed toward the key-levers by a spring 33; but when in its lowest position it is held away from said key-levers by a roll 34, which runs on a fixed cam-surface 35. The bar 31 is carried pivotally upon arms 36 of a shaft 37, which shaft is rocked to raise the bar during each revolution of the escape-shaft by means of an arm 38 engaging a notch in a slide 39, which slide is moved vertically by means of cam-lever 40, having a roll 41, which engages a cam 42, and an arm $40^a$, which engages a cam $42^a$ on the escape-shaft. When one or more key-levers are operated, the bail 17 is raised, the escape-shaft clutch Q operated, the escape-shaft makes a revolution, and the universal bar 31 is raised in the manner just described. As the said bar rises, its upper edge moves forward, the roll 34 riding on the cam 35, and the forward edge 32 engages and raises the lifting-bars 4, which have been partially raised while it passes over the lifting-bars of the key-levers which have not been operated. All of the designated push-rods are therefore raised mechanically and simultaneously, while the key-levers which have not been operated are rendered inoperative until the lifting-bar 31 is returned to its normal position and the escape-shaft has completed its movement. The operator has therefore simply to operate the key-levers with sufficient force to raise the light bail 17 and trip the clutch Q. At each revolution of the escape-shaft the ejector-bar 9 moves forward and back, carrying with it such ejectors as have been raised by the push-rods. The ejectors are flexible, so that their rear ends can be raised.

The type are arranged in the magazine with nicks up and are ejected from the magazine onto an assembling typeway 43. Above the typeway is a cap-rail 44, upon which is mounted what may be termed a "compound" nick-guide, comprising a vertically-movable horizontal bar 45 and a series of small slides 46, mounted on said bar and having their lower edges normally in line and in position to engage the forward nicks in the type. The slides 46 are independently movable and are normally pressed down by small springs 47.

The bar 45 is carried by the lower arms of two bell-crank levers 48, the upper arms of which are connected to a rod 49, which is reciprocated longitudinally by means of bell-crank lever 50, slide 51, and cam 52 on rock-shaft 12, previously referred to. The compound nick-guide permits a delicate pressure to be brought to bear on each type as it is ejected to retard the type and prevent the letter from being injured by striking violently against stop 53, Figs. 3 and 9. The stop 53 is connected by hinges 54 to a hinged casing 55, which incloses the type-shuttle. The bar 45 and nick-guide are raised to prevent the forward ends of the type from striking the nick-guide and depressed immediately when the heads have passed the nick-guide to exert a braking action on the type. The type are moved along the typeway to the stick in which they are assembled by means of a type-shuttle 56, Figs. 1, 3, 9, and 10. Said shuttle is in the form of a yoke extending under the typeway and having a pair of arms which embrace the typeway and are adapted to be moved above its surface to engage the type. The arms have pivot-pins 57, which slide in grooves 58 in the typeway. The rear arm of the shuttle carries a roll 59, which runs in a groove in a vertically-movable horizontal bar 60, which is carried by slides 61 62, connected by means of elbow-levers 63 and a connecting-rod 64. The bar 61 is connected to an arm 62$^a$ upon a rock-shaft 63$^a$, which shaft is operated by a cam-lever 364, engaging a cam 65 on the escape-shaft P', Figs. 1, 3, 9, and 13. The cam-lever 364 has an arm 365, which extends over the rear end 129$^a$ of the starting-key 129, Figs. 7 and 8. When the starting-key is depressed, the rod 61 is thus drawn down and the type-shuttle prevented from rising and driving type into the stick until the transfer nick-guide has returned to its normal position. The shuttle is reciprocated by means of a cord 66, which is connected to a depending shank 67, Figs. 3, 9, and 10. The cord passes around an idle sheave 68 and is carried three times around a drive-sheave 69 and suitably connected thereto at one point to prevent slipping. The sheave 69 is limited to three revolutions in each direction by a stop-motion device 70, the operation of which will be apparent from inspection of Fig. 9. The sheave 69 is loosely mounted on its shaft 71 and connected thereto by a coiled spring 72. A yielding connection is therefore provided for the type-shuttle, which permits said shuttle to stop in any part of its travel should a type stick on the typeway without injury to the machine. The shaft 71 is driven by means of gears 73 74, shaft 75, pinion 76, and vertical rack 14, previously referred to. At the rear end of the shuttle-raising bar 60 is a latch 77, which engages a shoulder 78 on said bar when the bar is lowered, holding it down during the movement of the shuttle to the right or rearward. When the shuttle reaches the end of its travel, it strikes the latch 77 and releases the bar 60, permitting it to be raised by a suitable spring to carry the fingers of the shuttle up above the typeway into position to engage the type on said way as the shuttle moves forward. All of the type ejected are thereby carried to the left and assembled on the assembling-stick.

*The magazine.*—The magazine comprises a series of channels separated by division-plates 79. As shown in Fig. 3, these division-plates are considerably less in width than the length of the type, excepting at their lower ends, where they widen out, as shown at 80. These shallow type-channels are more satisfactory than channels having a depth equal to or greater than the length of the type. The partitions are liable to be slightly warped in places, causing them to bind upon the type, and I have found that if the forward edges of the partitions bind upon the type near their middle portions the obstruction is much less serious than when they bind at the ends of the type, as sometimes happens when the channels are of full depth. By widening the channels at their lower ends, as shown in Fig. 3, the type are accurately alined for the ejectors. Upon the upper end of the magazine is a rail 81, upon which runs a magazine-loading device. This device comprises a carriage 82, having wheels 83, which run on the rail 81. The rail is provided with a series of letters on its front face and the carriage is provided with an index device adapted to locate the carriage with reference to any particular type-channel by bringing the index opposite the corresponding letter on the rail. As shown, the index device consists of sight-holes 84, through which the letters upon the panel 85 may be seen, Fig. 25.

Referring to Figs. 15 and 16, X indicates a tray suitable for holding a row of type for filling one of the magazine-channels, and Y indicates a holder for the tray adapted to retain the type therein while the tray is being arranged in the position over the magazine-channel into which the type are to be loaded. The tray is provided with a flange 86 on its sides and one end to retain the type, and at the other end the bottom is bent under, forming a hook 87. The tray-holder Y has a bottom portion 88 in which the tray fits, the flanged end of the tray passing under a retaining-stop 89 and the hook 87 of the tray passing into a recess 90 in the end of the tray-holder. Said holder has a hinged cover 91, provided with a flange or rail 92, adapted to engage the type-bodies and hold the type firmly in the tray when the cover is closed upon the type, as shown in Fig. 23. The cover is provided with a thumb-piece 93, by means of which it is conveniently kept closed upon the type.

The carriage 82 is provided with an alining device comprising a slide 94, having its ends beveled. The lower beveled end 95 is adapted to fit into the upper end of the type-channel to aline the carriage and type-holder accurately with the channel. The slide 94 is controlled by an arm 96 and thumb-lever 97 on the small rock-shaft 98. On a sleeve 99, adjacent to the slide 94, is an arm 100, which bears upon the upper beveled edge 101 of the slide. The sleeve 99 has a second arm 102, adapted to bear on the lower end of the cover 91. The carriage 82 has a standard 102, which supports a pair of diverging arms 104, adapted to receive the type-tray holder and maintain it in a vertical position.

The operation of loading a channel is as follows: The type are stored in trays X, and when the type in one of the channels become nearly exhausted a tray of corresponding type is placed in a holder Y and the cover 91 closed over it. The type are held in the tray and holder by holding down the cover with the thumb and finger. The tray and holder may thus be readily handled with one hand. With the left hand the operator depresses the lever 97 to raise the slide 94 and moves the carriage until the letter corresponding to the type in the tray is seen through one of the holes 84. The lever 97 is then released, and the slide 94 is depressed by means of a spring 105, Fig. 25. The tray and holder are then placed in vertical position in the carriage. The slide 94 will accurately aline the bottom of the tray with the right wall of the channel whether the latter is wide or narrow. The flange or rail 92 on the cover 91 is automatically alined with the opposite side of the channel by means of the arm 102, which bears upon the cover, the arm 102 being adjusted by the contact of the arm 100 upon the upper incline 101 of slide 94. A suitable pin or instrument is then placed under the row of type and they are lowered into the channel. To indicate when enough type have been taken from the channel to permit the trayful to be inserted, I provide suitable marks on the channel-partitions, which marks may consist of notches cut in the edges of said partitions, as shown at 106, Fig. 3.

*Justifying apparatus.*—The lines of type are assembled with temporary spaces, which are used to separate the words until the justifying-spaces are substituted. The justifying-spaces are cut from bars of space-timber, preferably type-metal, having the same cross-section as the type-bodies. The timber is moved up against a gage and a justifying-space cut off and inserted in the line each time a temporary space reaches a certain station on the typeway leading to the galley. The temporary spaces are automatically taken from the line and conveyed back to their channel in the magazine. The justifying devices for setting the gage are substantially the same as those described in Patent No. 607,047, previously referred to, and they will be passed over briefly, with the exception of one or two novel features, which will be especially pointed out. The temporary spaces are stored in the left-hand channel 107 of the magazine. The space-ejector is brought into action by a push-rod in the same manner as the type-ejectors. The space-key 351 is connected to a rock-shaft 352, which carries an arm 353, engaging a lever which is similar in all respects to a type-lever, as shown in Fig. 3. The space-ejector 108, which is larger than the type-ejectors, Figs. 3, 7, and 8, is connected by link 350 to an arm 109 on a rock-shaft 110. The rock-shaft 110 carries at its opposite end a short arm 111, to which is attached a feed-pawl 112. Each time a space is ejected the feed-pawl engages a ratchet-bar 113 and moves it rearward one tooth, the ratchet-bar being prevented from returning by a holding-pawl 114. A spring-operated pinion 120 tends constantly to return the ratchet-bar to its forward position. Upon a T-shaped vertically-movable slide 115 is mounted a horizontal slide 116, carrying an interponent 117, which interponent travels under the evenly-spaced ends of a series of fulcrum-bars 118. The upper ends of the fulcrum-bars are unevenly spaced, as in the patent above referred to. The interponent-slide has a projection 116$^a$, which is engaged by a finger 113$^a$ on the slide 113, Fig. 7. The horizontal portion of the T-shaped slide 115 carries a pawl 119, which engages teeth 119$^a$ on the interponent-slide 116 as said slide is moved rearward. When the last temporary space is inserted in the line, the line-key is struck and the line-shaft turned through one revolution, as will be presently explained. The cam 121 raises an arm 122, which in turn lifts the slide 115, and the interponent carried thereby raises one of the fulcrum-bars 118. The rock-shaft 123 has a cam portion which strikes the tail end of the holding-pawl 114 and throws said pawl out as the interponent-slide rises, thereby permitting the ratchet-bar 113 to be thrown back by its spring-pinion 120. The interponent-slide 116 is normally urged toward the front of the machine by a pinion 124 and coiled spring 125. As the shaft 123 is rocked to raise the slide 115 an arm 126 on said shaft moves away from and releases pawl 119 and permits it to hold the interponent-slide 116 while it rises and returns. The pawl 119 takes hold of slide 116 before the pawl 114 releases ratchet-bar 113. As the slide 115 returns the pawl 119 engages arm 126, which trips the pawl and permits the interponent-slide 116 to be returned to its initial position by the spring 125. The starting-rack 127 is sustained in an elevated position by a dog 128, Fig. 8. When the starting-key 129 is depressed, a connecting-link 130 throws off the dog and permits the starting-rack to drop by its own weight. As the rack 127 falls it rocks the shaft 123 by means of the arm 131 and link 132, Figs. 8 and 14. Upon the shaft 123 is an arm 133, which operates a clutch-lever 134, Figs. 1, 5, and 18. On the lever 134 is an inclined surface 135, which normally holds a spring-pawl 136 out of engagement with a series of teeth 137 upon the constantly-running wheel $l^4$. When the shaft 123 is rocked, the lever 135 is thrown off from the shaft L, permitting the pawl 136 to engage the wheel $l^4$ and starting the shaft L, the pawl 136 being pivoted in said shaft. During the revolution of the shaft L the cam 138 on said shaft, Fig. 14, engages a roll 139 on lever 131 and raises the starting-rack 127 until it is reëngaged by the dog 128, thus restoring said rack and its connected parts to their initial position. As the lever 131 is raised and the shaft 123 rocked the arm 133 releases the lever 134 and the incline 135 is thrown by a spring (not shown) into the path of pawl 136, which pawl is withdrawn from the teeth 137 at the end of a single revolution of the line-shaft.

The type are assembled on an extension 140 of the typeway, which assembling-place will be termed the "stick." Overlying the stick is the movable nick-guide 141, Figs. 1, 8, and 14. This nick-guide is connected to the head of a T-shaped slide 142, which slide is operated by means of a connecting-rod 143, crank 144, and pinion 145, in mesh with the starting-rack 127. The nick-guide 141 is hinged at 146 to a depending portion of the slide 142. When the starting-key is depressed and the starting-rack dropped, as heretofore described, the nick-guide 141 is thrown back, carrying the type into the position shown in Fig. 14. The rear nick-guide 147 is carried by a rock-shaft 148. To an arm 149 on said rock-shaft is connected a link 150, the rear end of which is sustained by a short link 151. Upon the rear end of link 150 is a dog 152, which is normally held in the position shown in Fig. 14 by a spring 153. The end of the dog is beveled and normally stands in a notch 154. As the starting-rack moves downward the link 150 is moved forward by the beveled side of the notch 154, thus raising the rear nick-guide 147 to permit the type to be moved under it. As the starting-rack reaches its lowest position the line of type is brought into position under the rear nick-guide, and simultaneously the dog 152 drops into a second notch 155, thus permitting the rear nick-guide to engage the nicks in the type. As the starting-rack is raised to its normal position the spring 153 yields and the dog passes from notch 155 to notch 154 without raising the nick-guide. During this time the forward nick-guide 141 by reason of being hinged leaves the forward nick in the type and returns to its normal position to receive the succeeding line. Upon the forward nick-guide is an arm 156, which runs under a guide 157, Fig. 8, as the nick-guide reaches its forward position, thus bringing it positively into alinement with the assembling nick-guide. The nick-guide 141 may be termed the "transfer" nick-guide. In order to ascertain when the line is full, the plunger 158 is arranged to move vertically across the stick. This plunger is connected to an elbow-lever 159, Fig. 1, which carries a bell-hammer 160, arranged to strike the bell 161 when the plunger 158 is intercepted by type in the stick. The elbow-lever 159 is carried by an arm 162 on the shaft 63. A spring 163 tends to hold the hammer away from the bell. As the shaft 63 is rocked the plunger 158 is thrust into the stick. As soon as the line in the stick is full the plunger will be intercepted by the end type and the hammer will be thrown against the bell.

*Line-measuring devices.*—In the rear position of the line of type, as shown in Fig. 8, the line rests upon front and rear rails 164 and 165, which may be termed the "justifying-typeways," Figs. 8, 14, and 20. Running in a groove in these typeways is a slide 166, Figs. 5, 8, and 17, which slide carries a head 167, adapted to ride on the typeways and transfer the line of type through the spacing mechanism to the galley. The line-pusher 167 is drawn to the left by a cord 168 and weight 169, the cord passing over a pulley 170. Upon the shaft 171 is a winding-drum 172, to which is attached a cord 173, carrying a weight 174, which is heavier than the weight 169 and designed to raise said latter weight after each line is justified and ready to be transferred to the galley. The weight 174 is normally raised and retained in this position by a pivoted latch 175, which engages an arm 176 upon a shaft 171. The cord 177 is connected to slide 166 and passes over the pulley 178 and through an arm 179 of weight 174 to a small weight 180. When the slide 166 reaches the end of its travel, in which position the line is opposite the galley, the end of the slide strikes a latch-lever 181 and withdraws the latch from under an arm 182 upon shaft 183, which carries the pivoted stop 175. The arm 182 drops, the stop 175 is raised, the arm 176 released, and the weight 174 permitted to fall. The projection 179 on said weight engages the weight 180 and carries it down, thus returning the rack 166 and raising the weight 179. When a new line is moved back onto the justifying-typeways, the line-shaft is started, as heretofore described, and the master-weight 174 is wound up, the shaft 171 being turned by means of gears 184 185, Figs. 5 and 17. The gear 184 is loose on the shaft L. An arm 187, fixed on said shaft, carries a spring-pawl 188, which engages a lug 189 on gear 184 when the shaft is started. As the shaft revolves gear 184 is carried with it until the tail of pawl 188 strikes the shaft 123. This causes the pawl to ride over the lug 189, permitting the gear 184 to stop. The gear 184 is therefore free to return to the position shown in Fig. 8 as the weight 174 falls. As the line-shaft turns a cam 186 raises the arm 182 and it is reengaged by the latch 181. The pivoted stop 175 is thereby brought into position to retain the arm 176, which is permitted to pass under it, but not permitted to return. All of the parts are thus restored to their initial positions.

The line is measured and the aggregate width of the additional spaces necessary to justify the line is divided by a justifying-lever, as in Patent No. 607,047, above mentioned, with the exception of several improvements in details of construction. There is a justifying-lever Z, Figs. 4, 5, 7, and 8, which coöperates with the fulcrum-bars 118, one end of the justifying-lever being connected with the gage which determines the width of spaces and the other end of said lever being connected with the movable part which measures the line. As shown, the front end of the lever Z engages a knife-edge 191, carried by a slide 192, which is supported by rollers 193 in grooves 194. Slide 192 carries a pin 192$^a$ to engage and return lever Z after a line is measured. The right ends of the grooves are inclined upward, as shown in Fig. 5, to raise the measuring-head 195 above the path of the type when the slide 192 is drawn to the right. The head 195 is adjustable on the slide 192 and may be held in any desired position by engagement of a pawl 196 with a ratchet-bar 197, carried by said slide. Adjacent to said ratchet-bar is a scale 198 to indicate different lengths of lines. The line of type is measured between the head 195 and an abutment-block 200 on the slide 199, which is elevated at proper intervals to bring the abutment into position to intercept the line of type as it is moved along the typeway by a cam 201 on the line-shaft L, Fig. 5. The line-pusher 167 stands normally in its right-hand position, being drawn to that position after each line is justified by the falling of the master-weight 174. After a line is shifted from the stick back to the typeway the line-shaft L starts, and its first movement winds up the large weight, permitting the line-pusher to carry the line over against the abutment 200. The slide carrying the measuring-head 195 is then drawn to the left by means of a cord 202 until said measuring-head engages the pusher 167, Figs. 4, 5, and 8, which cord passes around pulleys 203 and 204 and is connected to a lever 205, which is normally drawn down by a weight 206. The lever 205 carries a roll 207, which engages a cam 208 on line-shaft L. This cam permits the slide 192 to be drawn to the left at the proper time to measure the line and to be returned to its right-hand position by a spring 209, Fig. 4, after the line is measured and the gage is set. The movement of the slide 192 to the left rocks the justifying-lever Z upon the fulcrum-bar corresponding to the number of word-spaces in the line. The rear end of the justifying-lever is connected to a slide 210, to which is connected the gage-block 211, Figs. 4, 7, and 8. The gage-slide 210 is normally drawn to the left by a spring 212, Fig. 7. The cam-lever 213, Figs. 4, 5, 7, and 8, having a roll running on cam 215 of line-shaft L, has a pin 216, which normally sustains a weighted rod 217 in the rear of the justifying devices. After the gage is adjusted the lever 213 permits the rod 217 to fall.

A clamping-screw 218 is provided for clamping the gage-slide 210. This clamping-screw has an arm 219, which is drawn down by a spring 220, but normally held in an elevated position by a pin 221 on the weighted slide 217. A wedge-carrying slide 222 is sustained by a pin 223, resting on an arm 224 on the weighted slide 217. As the weighted slide 217 falls the spring 220 clamps the gage-slide by means of a screw 218. The wedge-slide also falls and carries the wedge 225 against a shoulder 226, carried by the slide 210, Figs. 4, 7, and 8. The space-gage is thus locked in position by the screw, and the wedge forms a solid abutment to prevent the gage from being disturbed by the impact of the space-timber which is moved against it preparatory to cutting each justifying-space. During the first movement of the line-shaft the weighted slide 217 is raised to release the gage, which is then reset and immediately clamped and wedged for the succeeding line. Justifying-spaces are cut from strips of space-timber T by a saw S, the timber being moved against the gage automatically and the spaces being cut and thrust into the line in lieu of the temporary spaces, as will be presently described. The strip of space-timber has a notch 227 near its rear end which is engaged by a toe 228 on a slide 229, which is constantly urged to the right by a coiled spring 230, acting on a slide 229 through a shaft 231, gear 232, and rack-teeth on the bottom of slide 229, Fig. 19. After the space-timber is fed up to the gage it is locked in position by a pivoted clamp 233 until the saw has made a revolution and the cut space has been transferred to the line, Figs. 6, 18, 19. After the gage is set the abutment 200 is lowered and the line permitted to advance until the projecting ends of the first temporary space are intercepted by a pair of parting-fingers 239, carried by a reciprocating slide 240, Figs. 1, 5, 6, and 20. The parting-fingers are reciprocated by means of elbow-lever 241, lever 242, slide 243, and cam on cam-wheel 244 of constantly-running shaft K. Adjacent to the parting-fingers is a trigger-lever 245, the lower end of which constitutes a latch which normally sustains an arm 246 of an irregular lever 247, carrying two fenders 248 249, Figs. 1, 6, and 19. A pawl 250 has a pin 251, which rides on the fender 249, said fender normally preventing the pawl from engaging with the timber-releasing slide 235. The pawl 250 is constantly driven up and down by a lever 252, cam-slide 253, and cam on cam-wheel 244 of shaft K. A similar pawl 254 has a pin which runs upon a fender 248, said pin being pressed against the fender by a spring 255. The pawl 254 is carried by lever 256, which is operated from shaft K by cam-slide 257. (Shown in dotted lines, Fig. 6.) When a temporary space strikes the trigger 245, the arm 246 is unlatched, the fenders 248 249 permitted to swing to the right, and the pawl 251 engages the slide 235, raising it and causing the space-timber to be unclamped, so that it may be moved forward against the gage. Simultaneously the pawl 254 is permitted to engage an elevator-slide 258, mounted in the rear typeway, and raise it, Figs. 1, 5, and 6. The elevator-slide 258 is connected by a spring 261 to the elevator 259, Figs. 1 and 5, which lifts the temporary spaces from the line into a transfer-channel 260, through which said spaces are carried back to the magazine. The elevator-slide is drawn down by lever 256, engaging an arm on its lower end.

To relieve the pressure upon the line while the temporary space is being ejected, a spring-pawl 262 is provided, standing normally below and free from the ratchet-teeth on the slide 166. The pawl 262 is carried on a lever 263, to which it is connected by a spring 264. A shoulder on the pawl engages a fixed stop 265 to throw the pawl normally out of action. As the elevator rises a roll on the elevator-slide engages lever 263, throwing it to the right and causing pawl 262 to move the pusher-head 167 to the right, thus relieving the pressure on the line and preventing the overturning of the type next the temporary space while the elevator lifts the space into the space-transfer channel. The pawl 262 is engaged with the rack 166 during the revolution of the line-shaft L to prevent the line-pusher from operating by means of a cam 347 and slide 348, operating on an arm 349 of lever 263, as shown in Fig. 5. The space-timber clamp controls the production of justifying-spaces, and by controlling the operation of said clamp and the elevator by a common device the introduction of one justifying-space for each temporary space withdrawn is assured. The space-return channel 260 leads the temporary spaces from the elevator to a point near the upper end of the space-channel 266 at the right of the magazine C. A rocking carrier 267, Figs. 1, 3, 4, and 8, has an opening 268, into which the leading space in the channel 260 is pushed as the elevator inserts a new space at the bottom of the channel, the channel being always filled with spaces. The carrier 267 has an arm 269, which is engaged by a spring-arm 270 of an elbow-lever 271, which is vibrated by a crank-pin 272 on the end of the saw-shaft K. The crank-pin is so arranged that the carrier 267 is held by a spring 270 in contact with a stop 273 while the elevator is operated to push a temporary space into the transfer-channel. After the temporary space is lifted by the elevator the carrier is rocked, and the leading space in the channel is dropped into the channel 266.

In the machine of Patent No. 607,047 the spaces are cut by a reciprocating saw having a series of teeth each projecting slightly more than the preceding tooth, so that each tooth cuts a small shaving from the space-timber. In the present case the saw S, Figs. 4 and 6, is constructed in the same manner excepting that the teeth are arranged on a spiral line and the saw is mounted on a shaft. A brush 274, Fig. 6, is used to clear the shavings from the saw. The severed space 275 is pushed forward by a U-shaped pusher 276, having fingers which engage the upper and lower ends of the space. The pusher is operated by a cam 277 on shaft K, Figs. 4, 6, and 20. The spring-stop 278 prevents a space from being carried too far forward and stops it over a curved runway 279, through which it is conveyed by a vibrating arm 280 into the opening which is formed in the line by the parting-fingers. The arm 280 is operated by pinion 281, rack 282, link 283, lever 284, and slide 285, having a roll 286, which runs in a groove in the cam-wheel 244. As a piece of space-timber is fed to the saw a rack 287, connected to a pinion 288 on shaft 231, is gradually lowered, and when the space-timber is used, so far as it is feasible to use it, a projecting arm 289 on said rack engages a pin on the weighted lever 290, Figs. 18 and 19. The gear $l^2$, which runs loosely on the timber-changing shaft M, has two opposite lugs 291. A spring-pawl 292, which is carried by shaft M, tends to spring into engagement with the lugs 292, but is held normally from such engagement by the tapered end 293 of the weighted lever 290. As the rack 287 reaches its lowest position it forces lever 290 downward and releases pawl 292, thereby permitting the pawl to engage one of the lugs of gear $l^2$ and causing the shaft M to make one revolution. At the beginning of this revolution a cam 294 rocks an elbow-lever 295, which is connected to the timber-clamp and releases said clamp. A cam 296, Figs. 6, 18, 19, having a roll 297 thereon, then engages the arm 289 and raises the rack 287, winding the spring 230 and withdrawing the timber-feed slide 229 to its initial position. A circular portion of cam 296 holds the timber-feed slide retracted while the stub of timber is ejected and a new strip of timber engaged with the slide, as will be presently explained.

The supply of space-timber is contained in a magazine U, Figs. 18 and 19. The timber is supported in the magazine by a reciprocating plunger 298, operated by racks 299 and pinions on a shaft 300. The shaft 300 is operated by a vertical rack 301, having a roll 302 resting on cam 303 on shaft M. While the timber-slide is held in retracted position, the movement of the shaft M withdraws plunger 298, permitting the lowest piece of space-timber in the magazine to drop in front of the plunger. The plunger is then moved forward, placing the piece of space-timber in engagement with the toe 228 and ejecting the remnant of the previous piece of timber. The shaft M is timed to make just one-half the number of revolutions of the shaft K, and the lugs 291 are so positioned on the gear $l^2$ that they will come into action when the teeth on the saw have just finished cutting a space. As the timber-changing devices are liable to come into action in the middle of a line, it is necessary to stop the action of the parting-fingers temporarily while the new piece of timber is being brought to the saw. This is accomplished by a cam 304 on shaft M coming in contact with a projection 305 on the lever 242, which operates the parting-fingers. The cam 304 holds the parting-fingers out of action during the entire revolution of the shaft M.

*Galley and leading mechanisms.*—When the last justifying-space is inserted in the line and the temporary space removed, the justified line moves to the extreme left of the typeways and stops in a position opposite the galley. The line-pusher is stopped by the latch-lever 181, while the line is prevented from moving too far by a stop 306, which is adjustable for lines of different lengths. The galley mechanism is carried on a bracket F at the extreme left end of the machine, Figs. 1, 2, 4, 5, 18, and 19. There is a fixed galley G, which is short but adapted to receive a removable galley G', the arm 307 being provided to support the outer end of the removable galley. The fixed galley has an adjustable side 308, Figs. 21 and 22, which is provided with an inclined plate 309 on its inner end adapted to engage the type as they are raised to the galley and cause them to register with the galley-mouth. The inclined plate 309 is adapted to yield longitudinally, being carried by a plunger 310, which is acted upon by a spring 311. The plunger is limited in its movement by a pin 312, projecting through a slot in the side piece 308. The movable side 308 can be adjusted to any position by means of a set-screw 313. On the rock-shaft 314 are a pair of arms 315, carrying a bar 316, which normally lies over the rear typeway 165. A friction-piece 317 is supported by links 318 from arms 319 on a rod 320, loosely pivoted in the arms 315, whereby the friction-piece is given a parallel movement. An intermediate friction-piece 321 bears on the line of type as it passes from the spacing devices to the galley. This intermediate piece slides vertically in suitable guides, as shown in Fig. 5. A line of type after passing under friction-piece 317 is swept up over a curved way 322 to a position opposite the galley by a partial revolution of the shaft 314. This shaft is connected by a spring 323, Fig. 2, with a gear 324, in mesh with a rack 325, which is reciprocated by link 326 and arm 327 on the end of shaft L. The spring connection permits the bar 316, which carries the line of type, to remain stationary opposite the galley long enough to permit the line to be pushed into the galley. The line is pushed into the galley by a T-shaped head 328 of a slide 329, which is operated by a forked lever 330, having two arms 331 332, which engage cams 333 334 on the line-shaft L.

Above the galley-mouth is a magazine V for leads 335. The leads are pushed out one at a time by a slide 336, provided with racks 337, operated by pinions 338 on a shaft 339, which is driven by pinion 340, in mesh with gear 324. The pinion 340 is arranged to slide on shaft 336, so that it may be thrown out of mesh with the gear 334 to stop the leading device. The leads are pushed onto a curved plate 341, and when the ejecting-slide is withdrawn they fall backward and rest on the galley-slide 328, as shown in Fig. 18. When slide 328 is withdrawn, the lead drops into position in the galley against the last line inserted. A pawl 342, pivoted to a stationary part, prevents the lead from tipping backward onto the curved way 332. Said curved way is hinged at 343 and provided with a spring-fastening 344, and it may be opened should the type stick or become pied between the typeway and the galley. Opposite the galley the typeway is provided with an auxiliary floor-piece 345, thus providing a solid floor. A downwardly-projecting flange 346, attached to the bar 316, engages the rear ends of the type to lift them to the galley.

The general arrangement of the mechanisms and the timing of the operations performed thereby are the same as in the machine shown in Patent No. 607,047, before referred to, and a general statement of the operation may therefore be omitted from this specification. The operation of the novel features of the present machine is set forth in connection with the description thereof in the foregoing specification.

Having described my invention, what I claim, and desire to secure by Letters Patent, is—

1. In a type-setting machine the combination of the key-levers, the lifting-bars pivoted to the rear ends of said levers, the push-rods overlying said bars, and means independent of the key-levers, for raising the bars and the push-rods, substantially as described.

2. In a type-setting machine the combination of the key-levers, the lifting-bars pivoted to the key-levers and extending rearward thereof, the push-rods overlying the bars, and the universal bar adapted to move forward and upward and raise such bars and push-rods as have been indicated by the key-levers, substantially as described.

3. In a type-setting machine the combination of the key-levers, the bars pivoted to the key-levers, the common bail overlying the bars, the escape-shaft arranged to be started by the common bail, the push-rods and the universal bar operated by the escape-shaft and adapted to raise the bars and push-rods indicated by the key-levers, substantially as described.

4. In a type-setting machine the combination of the key-levers, the bars pivoted to the rear ends of said levers, the bail overlying said pivoted bars, the push-rods, the escape-shaft, the rock-shaft operated by the escape-shaft, and the universal bar carried by arms of said rock-shaft and adapted to raise the pivoted bars and push-rods which have been brought into operation by the key-levers, substantially as described.

5. In a type-setting machine the combination with the assembling-typeways of a compound nick-guide comprising a series of independently-movable sections extending along and above said typeways, substantially as described.

6. In a type-setting machine the combination with a magazine and assembling-typeways of a compound nick-guide comprising a series of vertically-movable slides having their lower edges normally in line and held in such position by independent springs, substantially as described.

7. In a type-setting machine the combination with the magazine and assembling-typeways of a compound nick-guide comprising a vertically-movable bar and a series of independent slides vertically movable on said bar and having their lower edges normally in line to guide the type, substantially as described.

8. In a type-setting machine the combination with the magazine, the assembling-typeways and the type-ejecting mechanism, of a nick-guide overlying the typeways, said nick-guide being operated bodily by connection with the type-ejecting mechanism, and having independently-movable parts normally held in line by independent springs, substantially as described.

9. In a type-setting machine the combination with the typeways, of a type shuttle or driver, the cord for operating the same, the drive-sheave for said cord and the stop-motion device whereby said sheave is permitted to make a given number of revolutions in each direction and then positively stopped, substantially as described.

10. In a type-setting machine the combination with the assembling-typeways, of a reciprocating shuttle or driver having its operative end movable above and below the typeways, a vertically-movable bar connected with said shuttle to effect the vertical movements of its operative end, means for latching down said bar during the rearward movement of the shuttle and means for releasing the latch as the shuttle reaches the extreme of its rearward movement, substantially as described.

11. In a type-setting machine a keyboard in which the more commonly used letters occur two or more times and the less commonly used letters occur but once in combination with a magazine provided with two or more channels for each of said commonly-used letters and a single channel for each less commonly used letter, the keys and channels being so arranged as to form a maximum number of the combinations of letters used in common words and syllables, whereby a large number of combinations may be obtained and a large supply of the commonly-used type rendered available, substantially as described.

12. In a type-setting machine a magazine, a carriage movably mounted on the top of the magazine, and means carried by the carriage for alining a type-tray with any desired channel of the magazine, substantially as described.

13. In a type-setting machine the combination with a magazine of a carriage movably mounted on top of said magazine, a slide carried on the carriage and having a beveled end adapted to fit in a channel of the magazine to aline a type-tray therewith and means for sustaining a type-tray on the carriage, substantially as described.

14. In a type-setting machine the combination with the magazine of a carriage movable along the top of the magazine, means for sustaining a type-tray in said carriage and means for alining the type in a tray with a channel of the magazine comprising a slide having its lower end beveled and adapted to enter the channel, a lever engaging a bevel on the upper end of said slide, and an arm on said lever engaging a connection of the type-tray, substantially as described.

15. In a type-setting machine the combination with a magazine having a rail provided with a series of marks corresponding to the several channels, of a carriage movable on said rail, means for alining the carriage by the marks on the rail, means carried by the carriage for locking said carriage in alinement with any desired type-channel, and means for sustaining a type-receptacle in said carriage above said type-channel, substantially as described.

16. In a device for loading the magazine of a type-setting machine, a holder for a type-tray comprising a channeled portion to receive the tray and a hinged cover having a rail or flange adapted to bear on the top of the type in the tray, substantially as described.

17. In a type-justifying machine, devices comprising an abutment for one end of the type-line, a measuring-head movable into engagement with the other end of said line, a slide upon which said head is carried, and guides for said slides adapted to raise and lower the measuring-head as the slide is reciprocated, substantially as described.

18. In a type-justifying machine, line-measuring devices comprising an abutment, a measuring-slide provided with a scale indicating lengths of lines, and a measuring-head adjustable on said slide and adapted to be moved against the line, substantially as described.

19. In a type-justifying machine the combination with the typeways, an abutment movable into the path of a line of type on said ways, a pusher for conveying the line along the ways, a measuring-slide having a vertical and horizontal movement and an adjustable head on said slide adapted to engage the pusher, substantially as described.

20. In a type-justifying machine the combination with the elevator for temporary spaces of the line-pusher, the ratchet-teeth on said pusher, the elbow-lever 263, the pawl carried by said lever and adapted to engage said ratchet-teeth when the elevator is raised, the line-shaft, and connections whereby the lever 263 is operated from the line-shaft, substantially as described.

21. In a type setting and justifying machine, means for returning temporary spaces from the justifier-typeway to their channel in the magazine, comprising a runway for said spaces extending from said typeway to the magazine, an elevator for driving spaces from the line of type into the runway, and means for transferring the spaces from said runway to their appropriate channel in the magazine, substantially as described.

22. In a type setting and justifying machine the combination with the runway for temporary spaces, of a vibrating carrier arranged to receive spaces from the runway and transfer them to their channel in the magazine, an elevator for ejecting the spaces from the line into the runway and means for operating the elevator and the transferring device alternately, substantially as described.

23. In a type-justifying machine the combination with the gage and means for setting the same of a screw for clamping the gage and a wedge forming a temporary abutment therefor, substantially as described.

24. In a type-justifying machine the combination with a gage and means for setting the same of a screw for clamping the gage, an arm on said screw, a spring connected to the arm, a slide for raising the arm to release the screw, and a wedge adapted to be simultaneously operated by said slide, said wedge forming a temporary abutment for the gage to prevent its displacement during the justification of the line, substantially as described.

25. In a mechanism for justifying lines of type the combination of an elevator for temporary spaces, a timber-holding clamp, constantly-reciprocating pawls tending respectively to raise said elevator and release said clamp, fenders normally holding said pawls out of operative position, a trigger-lever and connections by means of which the trigger-lever withdraws the fenders simultaneously and permits said pawls to become operative, substantially as described.

26. In a type-justifying machine the combination with the typeways, a galley and means for transferring lines of type to the galley, of a lead-magazine above the galley-mouth, a curved guideway for directing leads to the galley-mouth and a slide for ejecting a lead from the magazine onto said curved guideway, substantially as described.

27. In a type-justifying machine, the combination with the typeways, the galley, the curved way leading from the typeways to the galley, a vibrating plate 316 and connections adapted to sweep a line of type from said ways to the galley, the slide 329 for moving the type into the galley, devices for dropping the lead into said galley as said slide is withdrawn and means for holding said lead in the galley until a succeeding line of type is brought against it, substantially as described.

28. The combination with the typeways, the galley, and the curved way leading from said typeways to the galley, of the rock-shaft 314, the plate 316 carried by said rock-shaft, the friction-piece 317 also carried by said rock-shaft, and the flange 346 adapted to engage the rear ends of the type and carry said type to the galley when the shaft is rocked, substantially as described.

29. The combination with the galley of the inclined yielding guide-plate 309 at the mouth of the galley, for the purpose described.

30. The combination with the galley of the adjustable side therefor and the inclined yielding guide-plate carried by said side at the mouth of the galley, for the purpose described.

31. The combination with the galley of the adjustable side, the inclined yielding guide and the spring-pressed plunger upon which said guide is mounted, substantially as described.

In testimony whereof I affix my signature in presence of two witnesses.

FRANK AMOS JOHNSON.

Witnesses:
M. C. WATSON,
J. A. WATSON.